United States Patent
Sartorius et al.

(10) Patent No.: US 7,587,580 B2
(45) Date of Patent: Sep. 8, 2009

(54) POWER EFFICIENT INSTRUCTION PREFETCH MECHANISM

(75) Inventors: Thomas Andrew Sartorius, Raleigh, NC (US); Victor Roberts Augsburg, Cary, NC (US); James Norris Dieffenderfer, Apex, NC (US); Jeffrey Todd Bridges, Raleigh, NC (US); Michael Scott McIlvaine, Raleigh, NC (US); Rodney Wayne Smith, Raleigh, NC (US)

(73) Assignee: QUALCOMM Corporated, San Diego, CA (US)

( * ) Notice: Subject to any disclaimer, the term of this patent is extended or adjusted under 35 U.S.C. 154(b) by 272 days.

(21) Appl. No.: 11/050,932

(22) Filed: Feb. 3, 2005

(65) Prior Publication Data

US 2006/0174090 A1    Aug. 3, 2006

(51) Int. Cl.
G06F 9/30 (2006.01)
G06F 9/40 (2006.01)
G06F 15/00 (2006.01)

(52) U.S. Cl. ................................................. 712/207
(58) Field of Classification Search ........... 712/207, 712/239
See application file for complete search history.

(56) References Cited

U.S. PATENT DOCUMENTS

| | | | |
|---|---|---|---|
| 5,740,417 A | 4/1998 | Kennedy et al. | |
| 6,425,076 B1 | 7/2002 | Killian | |
| 6,615,340 B1 * | 9/2003 | Wilmot, II | 712/209 |
| 6,633,970 B1 * | 10/2003 | Clift et al. | 712/217 |
| 6,681,322 B1 * | 1/2004 | Safford et al. | 712/244 |
| 6,735,688 B1 * | 5/2004 | Upton et al. | 712/218 |
| 7,062,639 B2 * | 6/2006 | Grochowski et al. | 712/226 |
| 2002/0099926 A1 | 7/2002 | Sinharoy | |

OTHER PUBLICATIONS

Manne & Grunwald; Pipeline Gating: Speculation Control For Energy Reduction; 1998; IEEE Computer Society; ISCA '98; pp. 132-141.*
McFarling; Combining Branch Predictors; Jun. 1993; Western Research Laboratory; TN-36; pp. 1-25.*
Smith; A Study of Branch Prediction Strategies; 1981; IEEE Computer Society Press; ISCA '81; pp. 135-148.*
Lee, Baer, Calder & Grunwald; Instruction Cache Fetch Policies for Speculative Execution; 1995; ACM Press; ISCA '95; pp. 357-367.*
Bahar et al.; Performance Analysis of Wrong-Path Data Cache Accesses; 1998, ISCA '98.*

(Continued)

Primary Examiner—Eddie P. Chan
Assistant Examiner—Corey S Faherty
(74) Attorney, Agent, or Firm—Nicholas J. Pauley; Peter M. Kamarchik; Sam Talpalatsky

(57) ABSTRACT

A processor includes a conditional branch instruction prediction mechanism that generates weighted branch prediction values. For weakly weighted predictions, which tend to be less accurate than strongly weighted predictions, the power associating with speculatively filling and subsequently flushing the cache is saved by halting instruction prefetching. Instruction fetching continues when the branch condition is evaluated in the pipeline and the actual next address is known. Alternatively, prefetching may continue out of a cache. To avoid displacing good cache data with instructions prefetched based on a mispredicted branch, prefetching may be halted in response to a weakly weighted prediction in the event of a cache miss.

11 Claims, 3 Drawing Sheets

OTHER PUBLICATIONS

Manne et al.: "Pipeline Gating: Speculation Control for Energy Reduction" Proceedings of the 256h Annual International Symposium on Computer Architecture. ISCA '98. Barcelona, Jun. 27-Jul. 1, 1998, Annual International Symposium on Computer Architecture, Los Alamitos, CA: IEEE Computer Soc, US, Jun. 27, 1998 pp. 132-141, XP000849911, ISBN: 0-8186-8492-5.

International Preliminary Report on Patentability-PCT/US06/006993, The International Bureau of WIPO, Geneva Switzerland-Aug. 7, 2007.

International Search Report-PCT/US06/006993, International Search Authority-European Patent Office-Nov. 3, 2006.

Written Opinion-PCT/US06/006993, International Search Authority-European Patent Office-Nov. 3, 2006.

* cited by examiner

POWER EFFICIENT INSTRUCTION PREFETCH MECHANISM

BACKGROUND

The present invention relates generally to the field of processors and in particular to a power efficient method of prefetching processor instructions.

Portable electronic devices provide a wide variety of organizational, computational, communications and entertainment services. These devices continue to increase in both popularity and sophistication. Two relentless trends in portable electronic device evolution are increased functionality and decreased size. Increased functionality demands increased computing power—in particular, ever faster and more powerful processors.

As well as providing advanced features and functionality that require faster processors, portable electronic devices themselves continue to shrink in size and weight. A major impact of this trend is the decreasing size of batteries used to power the processor and other electronics in the device. While increases in battery technology partially offset the problem, the decreasing size of batteries still imposes a strict power budget on all portable electronic device electronics, and in particular on their embedded processors.

Hence, processor improvements that increase performance and/or decrease power consumption are desirable for many applications, such as most portable electronic devices. Most modern processors employ a pipelined architecture, where sequential instructions, each having multiple execution steps, are overlapped in execution. For maximum performance, the instructions should flow continuously through the pipeline. Any situation that causes instructions to be flushed from the pipeline, and subsequently restarted, detrimentally impacts both performance and power consumption.

All real-world programs include conditional branch instructions, the actual branching behavior of which is not known until the instruction is evaluated deep in the pipeline. Most modern processors employ some form of branch prediction, whereby the branching behavior of conditional branch instructions is predicted early in the pipeline, and the processor speculatively fetches (prefetches) and executes instructions, based on the branch prediction. When the actual branch behavior is determined, if the branch was mispredicted, the speculatively fetched instructions must be flushed from the pipeline, and new instructions fetched from the correct next address. Prefetching instructions in response to an erroneous branch prediction adversely impacts processor performance and power consumption.

Known branch prediction techniques include both static and dynamic predictions. The likely behavior of some branch instructions can be statically predicted by a programmer and/or compiler. One example is an error checking routine. Most code executes properly, and errors are rare. Hence, the branch instruction implementing a "branch on error" function will evaluate "not taken" a very high percentage of the time. Such an instruction may include a static branch prediction bit in the opcode, set by a programmer or compiler with knowledge of the most likely outcome of the branch condition. Other branch instructions may be statically predicted based on their run-time attributes. For example, branches with a negative displacement (i.e., those that branch "backwards" in code), such as loop exit evaluations, are usually taken, while branches with a positive displacement (that branch "forward" in code) are rarely taken. Hence, the former may be statically predicted "taken," and the latter, "not taken."

Dynamic prediction is generally based on the branch evaluation history (and in some cases the branch prediction accuracy history) of the branch instruction being predicted and/or other branch instructions in the same code. Extensive analysis of actual code indicates that recent past branch evaluation patterns may be a good indicator of the evaluation of future branch instructions. As one example of a simple branch-history branch predictor, a plurality of one-bit flags may be maintained, each indexed by address bits of a conditional branch instruction. Each flag is set when the branch evaluates "taken," and reset when it evaluates "not taken." The branch prediction may then simply be the value of the associated flag. For some branch instructions, this predictor may yield accurate predictions.

A design goal closely related to maximizing branch prediction accuracy is minimizing the adverse impact of erroneous branch predictions. Consider the "branch on error" condition described above, with a one-bit flag as a dynamic branch predictor. Normally, the branch is not taken, and the associated flag remains a zero, predicting "not taken" for future executions of the instruction. When an error does occur, the branch is mispredicted and the wrong instructions are prefetched into the pipeline. The processor recovers from the erroneous branch prediction (sacrificing performance and wasting power), according to known branch misprediction recovery methods, and the flag is set to reflect the "taken" branch. However, the next execution of the branch instruction will still most likely be "not taken." In this case, the single-bit branch evaluation history causes two mispredictions for each anomalous branch evaluation—one for the anomaly and another for the next subsequent execution of the branch instruction.

One known technique for minimizing the deleterious effect of a mispredicted branch evaluation is to introduce the concept of a strong or weak prediction—that is, a prediction (i.e., taken or not taken) weighted by a confidence factor (e.g., strongly or weakly predicted). A simple example of this is a bimodal branch predictor comprising a table of two-bit saturating counters, indexed by memory access instruction addresses. Each counter assumes one of four states, each assigned a weighted prediction value, such as:

| 11 | Strongly predicted taken |
| 10 | Weakly predicted taken |
| 01 | Weakly predicted not taken |
| 00 | Strongly predicted not taken |

The counter increments each time a corresponding branch instruction evaluates "taken" and decrements each time the instruction evaluates "not taken." This incrementing/decrementing is "saturating," as incrementing stops at 0b11, and decrementing stops at 0b00. Thus, the branch prediction includes not only an outcome (taken or not) but also a weighting factor indicative of the strength or confidence of the prediction.

A branch instruction such as the "branch on error" considered above will only mispredict once with a saturation counter, rather than twice as with a single-bit flag predictor. The first branch prediction will move the predictor from "strongly not taken" to "weakly not taken." The actual prediction is bimodal, and is represented by the MSB. Hence, the next occurrence of the branch instruction will still be predicted "not taken," which is likely correct.

A bimodal saturation counter may be of arbitrary size. For example, a three-bit counter may be assigned prediction confidence strengths as follows:

| | |
|---|---|
| 111 | Very strongly predicted taken |
| 110 | Strongly predicted taken |
| 101 | Predicted taken |
| 100 | Moderately predicted taken |
| 011 | Moderately predicted not taken |
| 010 | Predicted not taken |
| 001 | Strongly predicted not taken |
| 000 | Very strongly predicted not taken |

Of course, the labels are terms of reference only; the binary value of the counter determines the strength of the branch prediction confidence, with greater confidence at either end of the range, and lower confidence towards the middle of the range.

Saturation counters may track prediction accuracy as well as branch evaluation, as known in the art. The output of a saturation counter may be a weighted value of "agree" or "disagree," and the output combined with a static prediction to arrive at a weighted prediction. In general, a broad array of branch prediction methods is known in the art, including those wherein a predictor is used not to predict the branch at all, but to select a prediction from between two or more other, independent predictors. See, for example, Scott McFarling's 1993 paper, "Combining Branch Predictors," Digital Western Research Laboratory Technical Note TN-36, incorporated herein by reference in its entirety.

While the introduction of a measure of confidence in a prediction improves branch prediction accuracy by tracking actual branch behavior over time, the actual prediction is bimodal, represented by the MSB. In the prior art, the branch is either predicted "taken" or "not taken, and prefetching proceeds from a predicted next address, which is either a branch target address or the next sequential address to the branch instruction. That is, the weighting of the prediction, or its strength, is not considered.

SUMMARY

In one embodiment the weighting, or strength, of a branch prediction determines whether the processor prefetches instructions following a conditional branch instruction. Instructions are prefetched for strongly weighted branch predictions. Processor resources and power are conserved in the case of weakly weighted predictions by halting prefetching and waiting for the branch condition to evaluate in the pipeline. Because weakly weighted branch predictions may be less accurate than strongly weighted ones, prefetching in response to a weakly weighted prediction carries a greater likelihood of a misprediction and subsequent pipeline flush. A weakly weighted prediction may halt prefetching altogether, or alternatively may only halt prefetching in the event of a cache miss.

One embodiment relates to a method of instruction prefetching in a processor having a branch prediction mechanism that generates one of a plurality of weighted branch prediction values. For strongly weighted predictions, instructions are prefetched, beginning at a predicted next address. For weakly weighted predictions, instruction prefetching is halted until the branch condition is evaluated.

Another embodiment relates to a processor. The processor includes an instruction execution pipeline and a branch prediction mechanism operative to predict the evaluation of conditional branch instructions and output a weighted branch prediction value. The processor additionally includes an instruction prefetching mechanism operative to speculatively fetch instructions from a predicted next address and load them into the pipeline responsive to a strongly weighted prediction from the branch prediction mechanism, and to halt instruction prefetching responsive to a weakly weighted prediction from the branch prediction mechanism.

Another embodiment relates to a method of preventing cache line replacement on mispredicted branches in a pipelined processor. The evaluation of a conditional branch instruction is predicting with a weighted value indicative of the prediction and a level of confidence in the accuracy of that prediction. a cache memory is speculatively accessed for the predicted next address following the conditional branch instruction. if the access misses in the cache and the prediction value indicates a low confidence of accuracy, a cache line replacement responsive to the miss is aborted.

DETAILED DESCRIPTION

Figure 1:
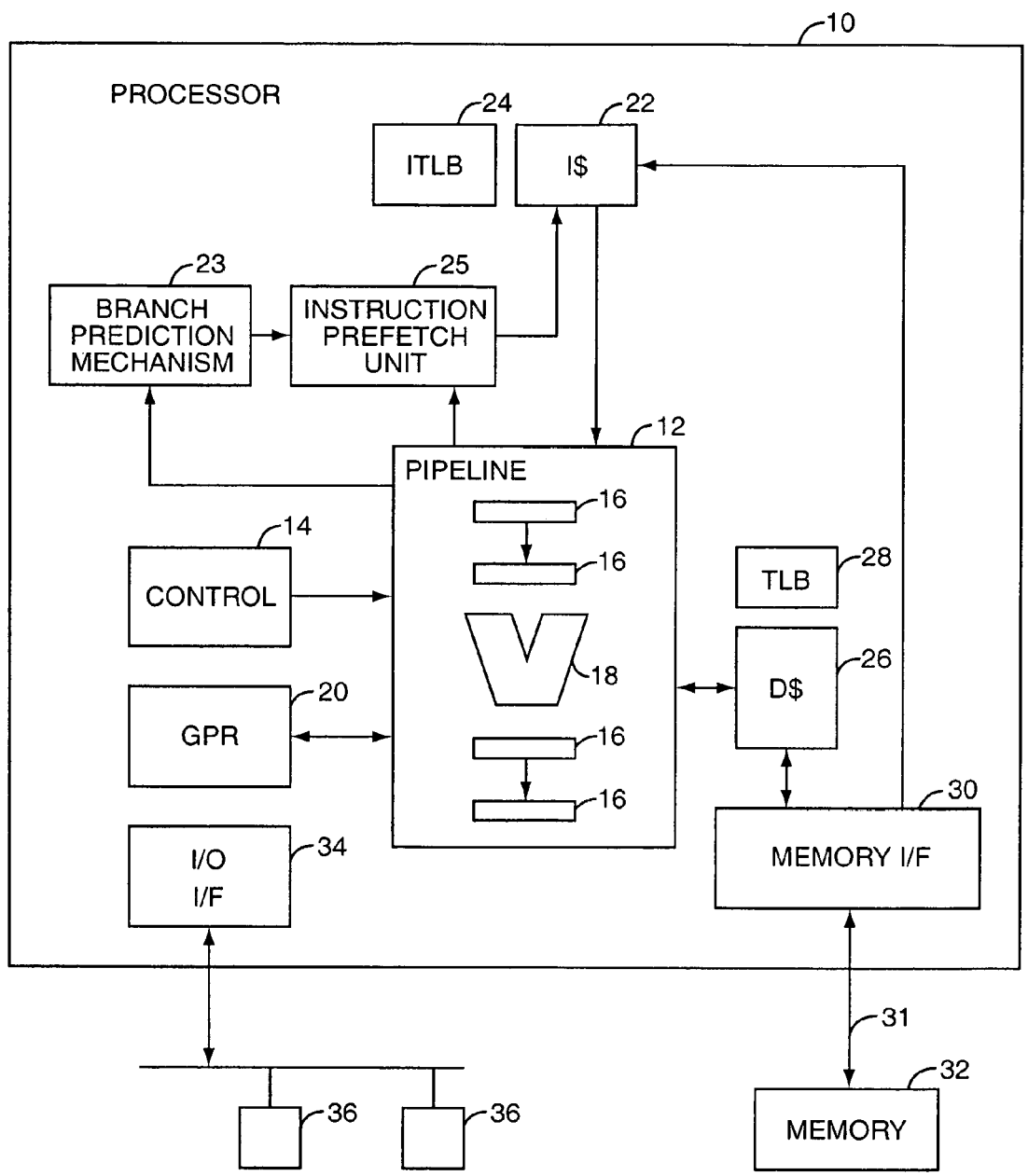
FIG. 1 is a functional block diagram of a processor.

FIG. 1 depicts a functional block diagram of a processor 10. The processor 10 executes instructions in an instruction execution pipeline 12 according to control logic 14. In some embodiments, the pipeline 12 may be a superscalar design, with multiple parallel pipelines. The pipeline 12 includes various registers or latches 16, organized in pipe stages, and one or more Arithmetic Logic Units (ALU) 18. A General Purpose Register (GPR) file 20 provides registers comprising the top of the memory hierarchy.

The pipeline 12 fetches instructions from an instruction cache (I-cache) 22, with memory address translation and permissions managed by an Instruction-side Translation Lookaside Buffer (ITLB) 24. When conditional branch instructions are decoded early in the pipeline 12, a branch prediction mechanism 23 predicts the branch behavior, and provides the prediction to an instruction prefetch unit 25. The instruction prefetch unit 25 speculatively fetches instructions from the instruction cache 22, from a branch target address calculated in the pipeline 12 for "taken" branch predictions, or from the next sequential address for branches predicted "not taken." In either case, the prefetched instructions are loaded into the pipeline 12 for speculative execution.

Data is accessed from a data cache (D-cache) 26, with memory address translation and permissions managed by a main Translation Lookaside Buffer (TLB) 28. In various embodiments, the ITLB may comprise a copy of part of the TLB. Alternatively, the ITLB and TLB may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30.

The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches 22, 26. In addition, one or more of the functional blocks depicted in the processor 10 may be omitted from a particular embodiment.

As discussed above, a wide variety of branch prediction methods and algorithms are known in the art. Regardless of the structure or methodology underlying various branch predictors, it is intuitively obvious, and may be statistically proven, that strongly weighted predictions are more accurate than weakly weighted predictions. That is, the more saturated values of the saturation counters more accurately predict branch behavior than do values toward the middle of the counters' weighting ranges. The middle values represent branch instructions whose recent evaluation history is in flux; the saturated values represent branch instructions with consistent recent evaluation history.

Figure 2:
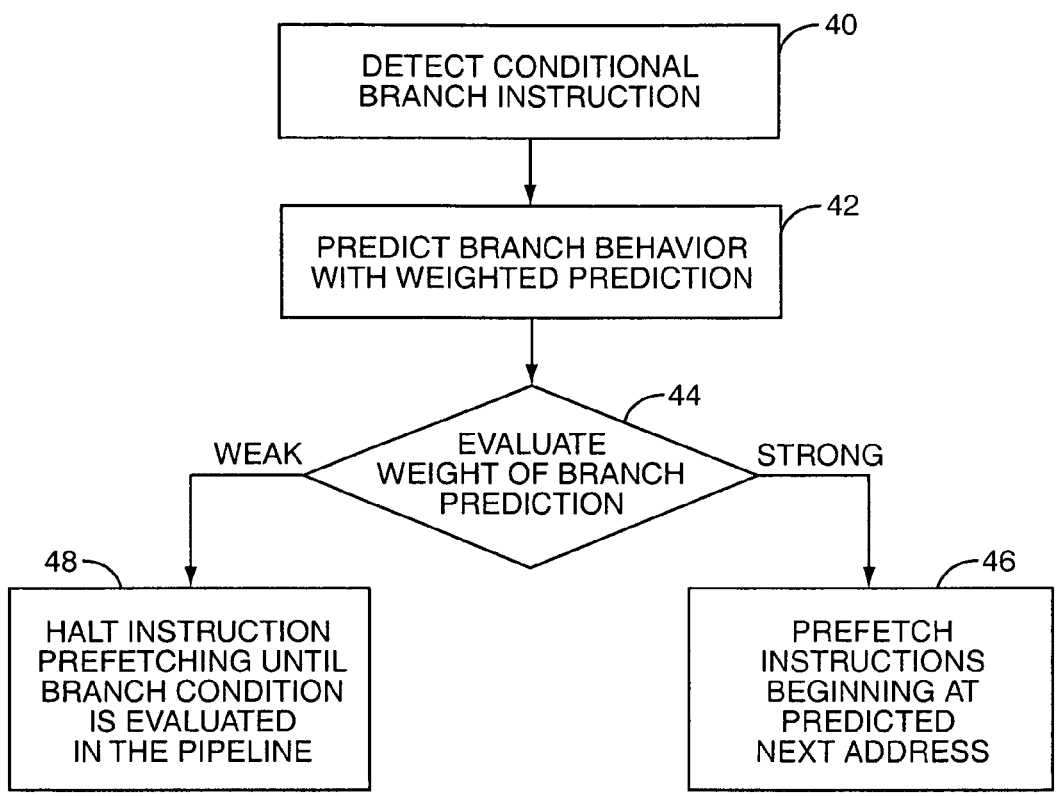
FIG. 2 is a flow diagram of a power-efficient instruction prefetching method.

This difference in accuracy between strongly and weakly weighted branch predictions may be exploited to conserve power in a pipelined processor 10, by only prefetching instructions for strongly predicted branch instructions. An exemplary branch prediction method is explained with reference to FIG. 2. A conditional branch instruction is detected in the pipeline 12 (block 40). This normally occurs in a decode pipe stage, but in some embodiments instructions may be predecoded prior to being loaded in the I-Cache 22, and the pipeline control logic 14 may recognize a conditional branch instruction immediately upon instruction fetch. As soon as the instruction is detected to be a conditional branch, its evaluation (e.g., "taken" or "not taken") is predicted (block 42), with a prediction having a weighed value. This weighted prediction is provided, for example, by the branch prediction mechanism 23. The weight of the branch prediction is evaluated (block 44), and in the case of a strongly weighted prediction, instructions are prefetched from the I-Cache 22 and speculatively executed in the pipeline 12 (block 46). In the case of weakly weighted predictions, the instruction prefetch unit 25 does not prefetch any instructions (block 48). Rather, the prefetch unit 25 halts prefetching until the relevant conditional branch instruction is evaluated in the pipeline 12, and its actual branch behavior is known. At that point, instruction fetching continues from the known proper next address.

In effect, this methodology transforms the bimodal branch prediction of the prior art (i.e., "taken" or "not taken") by adding a third state or directive to the prediction: predict branch taken and prefetch, predict branch not taken and prefetch, or wait for the actual branch condition evaluation. By not prefetching instructions from a weakly predicted branch target, the processor 10 does not waste the power required to prefetch instructions and begin their speculative execution, when there is a high likelihood (relative to strongly predicted branch outcomes) of the prediction being erroneous and having to flush the prefetched instructions.

In the case of strongly predicted branches, the methodology of the present invention has no impact on processor performance; prefetching occurs and the branch accuracy will affect performance as well known in the art. In the case of weakly predicted branches, where prefetching is halted, the impact on processor performance depends on the accuracy of the prediction and whether the relevant potential next address—that is, the branch target address or next sequential address—is resident in the I-cache 22. The performance impact is summarized in Table 1 below.

TABLE 1

Impact on Processor Performance

| | Predicted Address hits in I-Cache | Predicted Address misses in I-Cache |
|---|---|---|
| Weak Prediction Accurate | Stall the pipeline for the number of pipe stages between decode/prediction and branch evaluation | Stall the pipeline for the number of pipe stages between decode/prediction and branch evaluation |
| Weak Prediction Erroneous | Avoid the need to the flush pipeline and recover from the misprediction | Avoid the need to the flush pipeline and recover from the misprediction, and avoid displacing good data in I-Cache with unneeded instructions |

If the weakly weighted branch prediction is accurate, halting instruction prefetching reduces performance by introducing a stall in the pipeline. Instruction execution will be stalled (relative to having done the prefetching) by the number of pipe stages between the branch instruction decode and branch prediction, and the eventual branch condition evaluation. In this case, there will be no power savings, as the same instructions will ultimately be fetched and executed.

If the weakly weighted branch prediction is erroneous, however, not only does the prefetch halting methodology of the present invention save power, it may improve processor performance. If the predicted address is resident in the I-Cache 22, the processor 10 incurs the same stall as in the case of an accurate weakly weighted branch prediction. However, the controller 14 does not need to flush the pipeline 12 and engage in other misprediction recovery operations. Where a mispredicted branch requires an exception for recovery, having halted instruction prefetching represents a significant increase in processor performance over prefetching.

If the weakly weighted branch prediction is erroneous and the predicted address is not resident in the I-Cache 22, the prefetch halting methodology of the present invention saves power and considerably improves processor performance. In this case, the prefetch operation would miss in the I-Cache 22, causing a memory access and a cache line replacement. Accesses to external memory are slow and consume power, adversely impacting both performance and power management. Worse, however, the operation would displace an entire cache line with instructions that the processor 10 does not need to execute. This will likely cause a subsequent cache miss when the displaced instructions are again fetched, requiring the delay and power expenditure of yet another external memory access.

Figure 3:
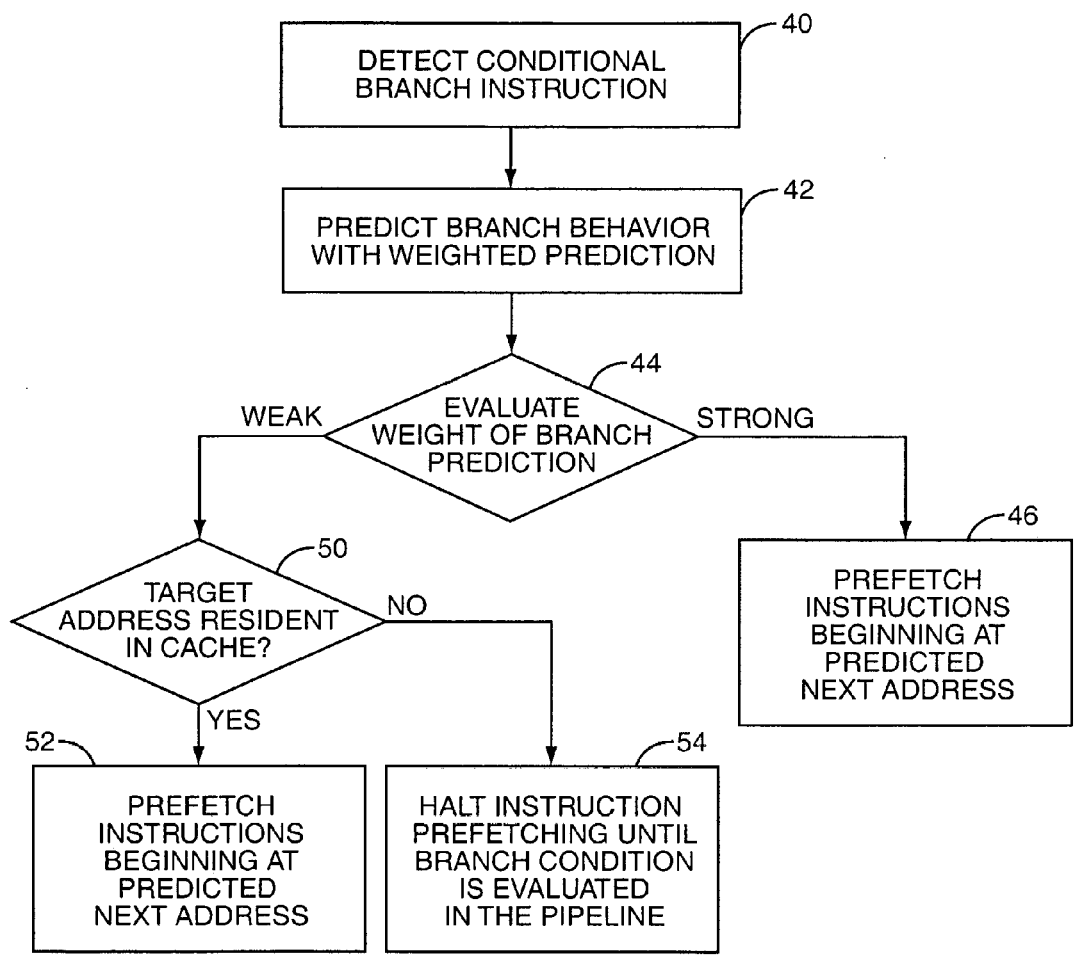
FIG. 3 is a flow diagram of a power-efficient cache management method.

In one embodiment of the present invention, instruction prefetching is not completely halted in response to weakly weighted branch predictions; rather it is halted only if a prefetch misses in the I-Cache 22, as described with reference to FIG. 3. As described above, a conditional branch instruction is detected (block 40) and its evaluation predicted (block 42). If the prediction is strongly weighted, instructions are prefetched from a predicted next address (block 46). If the prediction is weakly weighted, the instruction prefetch unit 25 accesses the I-Cache 22 to determine whether the predicted next address is resident therein (block 50). If the predicted address hits in the I-Cache 22, prefetching continues (block 52). If the prefetch operation misses in the I-Cache 22, then the prefetch operation is terminated, and prefetching is halted until the branch condition is evaluated in the pipeline 12 (block 54). In this embodiment, the stall in the event of an accurate weakly weighted branch prediction is avoided, while still safeguarding against the significant performance degradation incurred by a cache line replacement for an erroneous weakly weighted branch prediction.

Regardless of whether weakly weighted branch predictions completely halt instruction prefetching or only halt prefetching in the case of an I-Cache miss, in any given implementation, what constitutes a "weak" or "strong" prediction weighting must be defined. In applications where power savings are tantamount and some performance degradation is tolerable, a strongly weighted prediction may comprise only the most saturated values of a saturation counter. That is, from a hardware perspective, if all of the counter bits agree, the prediction is strongly weighted and prefetching is enabled; if any counter bits disagree, the prediction may be considered weakly weighted, and prefetching totally or conditionally disabled.

Where power savings is less critical and/or performance is more important, a more flexible approach may include counter values near, as well as at, the saturation level in the definition of strongly weighted. As one non-limiting example, the top and bottom 25% of counter values may be considered strongly weighted, and the middle 50% weakly weighted. For binary counters, a hardware perspective of this distribution is that if the two most significant bits agree, the prediction value is strongly weighted. Alternatively, the upper and lower third may be considered strongly weighted, and the middle thirds weakly weighted. Those of skill in the art will readily recognize the distinction between strongly and weakly weighted predictions may be defined in a variety of ways, as may be appropriate for a particular application.

As used herein, the terms strong and weak, and derivations thereof, are terms of reference. In particular, they refer to the outputs of any branch predictor that generates a weighted output indicative of a branch prediction and a level of confidence in the accuracy of that prediction, wherein strongly weighted refers to outputs indicating a high confidence and weakly weighted refers to outputs indicating a low confidence. Any processor 10 that completely or conditionally halts instruction prefetching and/or speculative instruction execution in response to a weakly weighted branch prediction is within the scope of the present invention.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A processor, comprising:
   an instruction execution pipeline;
   an instruction cache coupled to a memory subsystem;
   a branch prediction mechanism operative to predict the evaluation of a branch condition associated with a conditional branch instruction and output a weighted branch prediction value; and
   an instruction prefetching mechanism operative to selectively prefetch instructions from the instruction cache and, in the case of an instruction cache miss, to prefetch the instructions from the memory subsystem, in response to the weighted branch prediction value and whether the prefetch hits in the instruction cache, said instruction prefetching mechanism is halted thereby stopping the prefetch of the instructions from the memory subsystem in the case of a weakly weighted branch prediction and a cache miss, wherein the instruction prefetching mechanism is halted until the branch condition is evaluated in the instruction execution pipeline, and the instruction prefetching mechanism is performed in the case of either a strongly weighted branch prediction or a weakly weighted branch prediction and an instruction cache hit.

2. The processor of claim 1 wherein said branch prediction mechanism includes at least one saturation counter.

3. The processor of claim 2 further comprising combining the output of said saturation counter with at least one static prediction to produce said weighted branch prediction value.

4. The processor of claim 2 wherein said saturation counter comprises n bits, and further comprising:
   defining strongly weighted predictions as those wherein all n bits agree, and
   defining weakly weighted predictions as those wherein any bits disagree.

5. The processor of claim 2 wherein said saturation counter comprises more than two bits, and further comprising:
   defining strongly weighted predictions as those wherein the two most significant bits agree; and
   defining weakly weighted predictions as those wherein the two most significant bits disagree.

6. The processor of claim 2 wherein said saturation counter comprises an n-bit binary counter, and further comprising:
   defining strongly weighted predictions as those counter values less than or equal to N and greater than or equal to $(2^n-1)-N$; and
   defining weakly weighted predictions as those counter values greater than N and less than $(2^n-1)-N$;
   where N is a non-negative integer less than or equal to $(2^{n/2})-2$.

7. A method of prefetching instructions from an instruction cache, and in the case of an instruction cache miss, prefetching the instructions from a memory subsystem in a processor, the method comprising:
   executing instructions in an instruction execution pipeline;
   predicting the evaluation of a branch condition associated with, a conditional branch instruction to provide a weighted branch prediction value;
   selectively prefetching instructions from an instruction cache coupled to a memory subsystem; stopping the prefetch of instructions from the memory subsystem in the case of a weakly weighted branch prediction and a cache miss, until the branch condition is evaluated in the instruction execution pipeline; and
   prefetching the instructions in the case of either a strongly weighted branch prediction or a weakly weighted branch prediction and an instruction cache hit.

8. The method of claim 7 further comprising: combining the output of a saturation counter with at least one static prediction to produce said weighted branch prediction value.

9. The method of claim. 7 further comprising: defining strongly weighted predictions as those wherein all n bits of an n-bit saturation counter agree, and defining weakly weighted predictions as those wherein any bit of the saturation counter disagrees.

10. The method of claim 7 further comprising:
    defining strongly weighted predictions as those wherein the two most significant bits of a saturation counter comprised of two or more bits agree; and defining weakly weighted predictions as those wherein the two most significant bits of the saturation counter disagree.

11. The method of claim 7 further comprising:

defining strongly weighted predictions based on a saturation counter comprised of an n-bit binary counter as those counter values less than or equal to N and. greater than or equal to $(2^n-1)-N$; and defining weakly weighted predictions based on the saturation counter as those counter values greater than N and less than $(2^n-1)-N$, wherein N is a non-negative integer less than or equal to $(2^n/2)-2$.

* * * * *

UNITED STATES PATENT AND TRADEMARK OFFICE
CERTIFICATE OF CORRECTION

PATENT NO.       : 7,587,580 B2  
APPLICATION NO.  : 11/050932  
DATED            : September 8, 2009  
INVENTOR(S)      : Sartorius et al.

It is certified that error appears in the above-identified patent and that said Letters Patent is hereby corrected as shown below:

Title Page item (73), assignee: "QUALCOMM Corporated" to read as --QUALCOMM Incorporated--

Column 8, line 44, claim 7: "with, a" to read as --with a--

Column 8, line 59, claim 9: "claim. 7" to read as --claim 7--

Column 9, line 7, claim 11: "and. greater" to read as --and greater--

Column 10, line 3, claim 11: "anon-negative" to read as --a non-negative--

Signed and Sealed this  
Seventh Day of June, 2011

David J. Kappos  
*Director of the United States Patent and Trademark Office*